(12) United States Patent
Pfleging et al.

(10) Patent No.: US 7,653,193 B2
(45) Date of Patent: Jan. 26, 2010

(54) USER INFORMATION MANAGEMENT SYSTEM FOR CONTROLLING CONFERENCE BRIDGE CONNECTIONS

(75) Inventors: Gerald W. Pfleging, Batavia, IL (US); George P. Wilkin, Bolingbrook, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 909 days.

(21) Appl. No.: 11/338,081

(22) Filed: Jan. 24, 2006

(65) Prior Publication Data

US 2007/0172046 A1    Jul. 26, 2007

(51) Int. Cl.
*H04M 3/42* (2006.01)
(52) U.S. Cl. .................... 379/205.01; 379/202.01; 370/260
(58) Field of Classification Search .................. 379/157, 379/158, 202.01, 205.01, 207.03; 370/260, 370/261, 262, 263, 271
See application file for complete search history.

(56) References Cited

U.S. PATENT DOCUMENTS

| | | | |
|---|---|---|---|
| 5,844,973 A * | 12/1998 | Venkatraman et al. | 379/127.05 |
| 6,411,605 B1 * | 6/2002 | Vance et al. | 370/261 |
| 6,798,753 B1 * | 9/2004 | Doganata et al. | 370/260 |
| 2002/0172341 A1 * | 11/2002 | Wellner et al. | 379/202.01 |
| 2005/0213724 A1 * | 9/2005 | O'Brien et al. | 379/202.01 |
| 2006/0104221 A1 * | 5/2006 | Norton | 370/261 |
| 2006/0177034 A1 * | 8/2006 | Reding et al. | 379/211.02 |
| 2006/0291637 A1 * | 12/2006 | Erickson | 379/202.01 |

* cited by examiner

*Primary Examiner*—Creighton Smith
(74) *Attorney, Agent, or Firm*—Carmen Patti Law Group, LLC

(57) ABSTRACT

An apparatus and method is provided for managing and controlling connections to conference bridges for proposed conference call participants to access a scheduled conference call. A first call is made to a conference bridge. Next, an attempt is made to contact the proposed conference call participant for the conference call via a telephone call, an SMS message, or both. If contacted, the proposed conference call participant has options such as a) connecting to the conference call, b) not connecting to the conference call, or c) recording the conference call. If the proposed conference call participant cannot be contacted or is unavailable, then the conference call can be recorded for listening at a later time.

24 Claims, 2 Drawing Sheets

USER INFORMATION MANAGEMENT SYSTEM FOR CONTROLLING CONFERENCE BRIDGE CONNECTIONS

TECHNICAL FIELD

This invention relates to the art of conference bridges, and more particularly to the control and implementation of connections to conference bridges.

BACKGROUND

There is a continuing upward trend in the use of conference calls to conduct meetings. One of the key factors that drive this trend is the need to collaborate over distances in a cost-effective way. Telephone conference calls may be categorized as dial-out or dial-in conference calls. Dial-out conference calls require an operator to dial the telephone numbers of proposed conference call participants at an assigned date and time and then manually add each proposed conference call participant to the call. Dial-in conference calls require proposed conference call participants to dial-in into a specific telephone number at an assigned date and time. Two aspects to arranging a dial-in conference call include a) scheduling the conference call and b) connecting to a conference call bridge.

In order to schedule a dial-in conference call a) the conference bridge must be reserved, b) data such as the date, time, and location of the conference call along with the conference bridge telephone number and an assigned access code for the conference call must be entered into a computer system or c) a meeting request for the conference call must be accepted, e.g., by electronic mail, by proposed conference call participants. On the day of the conference call, a proposed conference call participant may receive an electronic mail reminder from a scheduling system or device that includes the subject, date, time, etc., of the conference call, and the names of other participants who have been invited to the conference call.

Several software systems and devices exist to assist individuals in scheduling conference calls. Examples of such systems/devices include Microsoft Outlook and personal digital assistance (PDA) devices. Disadvantageously, the proposed conference call participant must operate and view the display of the scheduling systems/PDA devices in order to be reminded of the scheduled conference call. Also disadvantageously, PDA devices must be synchronized with the computer system that contains the necessary conference call scheduling information.

In order to connect to the conference call bridge, the conference bridge telephone number must be accessed and dialed, and the assigned access code for the conference call must be provided at the time of the conference call. In many instances, the conference bridge telephone number may be a toll free number, e.g., 800 number, or a toll free number with an associated local telephone number. Typically, accessing and dialing the conference bridge telephone number is performed manually. However, at least one commercial contact and customer management software package, i.e., ACT (http://www.ACT.com), can provide limited access to a telephone line and dial the telephone number if an associated computer has a modem card. Disadvantageously, dialing a toll free number for a conference call may result in unnecessary telephone charges if the toll free number has an associated local telephone number, which, if used, would result in a lower cost call. Also disadvantageously, prior art systems do not automate the entire set-up of the conference call connection.

SUMMARY

We have recognized that the problems of the prior art in connecting proposed conference call participants to a scheduled conference call can be overcome, in accordance with the principles of the invention, by a user information management (UIM) system that manages and controls connections to conference bridges. More specifically, the UIM system manages and controls connections to conference bridges by a) initiating, via a first signaling protocol, a call to a first telephone number associated with a conference bridge at a first predetermined interval prior to a start of a scheduled conference call, b) initiating, via a second signaling protocol, a call to at least one telephone number associated with a proposed conference call participant at a second predetermined interval prior to the start of the conference call, and c) connecting the call associated with the at least one telephone number to the call associated with the first telephone number onto the conference bridge.

Advantageously, due to the UIM system, a proposed conference call participant need not synchronize and operate a PDA or other systems to be reminded of the conference call as done in the prior art, because the proposed conference call participant may be located and contacted via any of their telephones numbers, e.g., wireline, wireless, etc. Upon being connected to the call, the UIM system provides the proposed conference call participant with options for participating on the conference call, such as a) connecting to the conference bridge, b) not connecting to the conference bridge, or c) recording the conference call. Also, advantageously, the UIM system automates the entire set-up of the conference call connection eliminating the need to search for conference bridge telephone numbers, access codes, and dialing procedures as done in the prior art. Existing signaling protocols may be used to perform call setup and control without the use of a modem card. Further advantageously, the UIM system may call a lower cost local telephone number rather than a toll free number, if the local telephone number is available.

DETAILED DESCRIPTION

Figure 1:
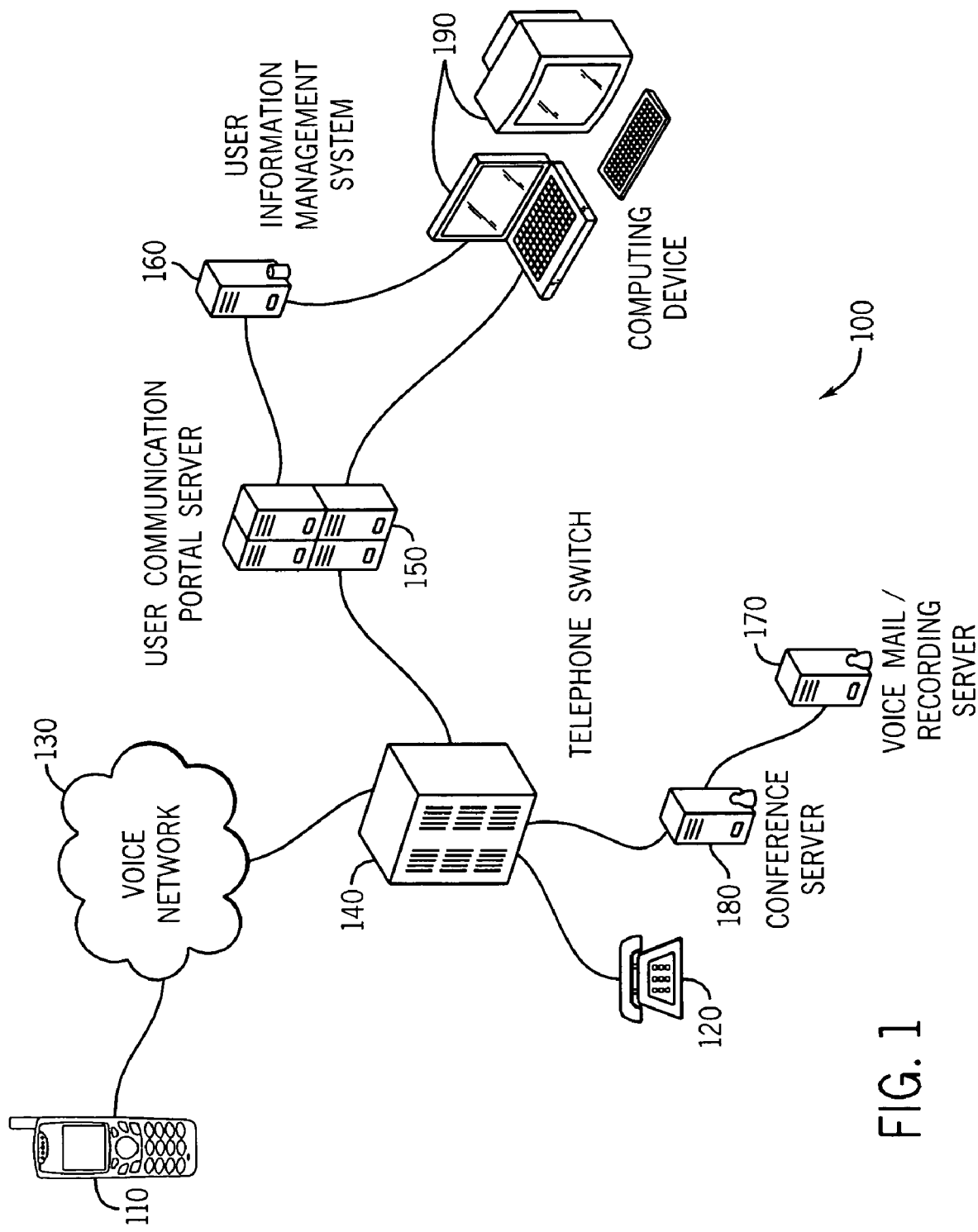
FIG. 1 shows a network view of a user information management system for managing and controlling conference call connections arranged in accordance with the principles of the invention.

FIG. 1 is a block diagram illustrating a communications network arranged in accordance with the principles of the invention. As shown in FIG. 1, communications network 100 includes mobile device 110, wireline telephone 120, voice network 130, telephone switch 140, user communication portal server 150, user information management (UIM) system 160, voice mail/recording server 170, conference server 180, and computing device 190.

Mobile device 110 is a communications device capable of wirelessly connecting to a voice network, e.g., voice network 130, via a telephone switching network having wireless technologies, not shown, that may include one or more wireless base stations connected to one or more base station controllers connected to one or more mobile switches. In one embodiment of the invention, mobile device 110 may be a small, light-weight portable mobile telephone, e.g., pocket telephone. In another embodiment of the invention, mobile device 110 may be a mobile telephone installed in an engine-driven vehicle and supplied with current from the vehicle electrical system. In an alternative embodiment of the invention, mobile device 110 may be a personal digital assistance (PDA) device, notebook computer, two-way pager or other suitable wireless devices.

Wireline telephone 120 is a telephone connected to a switching system, e.g., telephone switch 140, via one or more of a variety of terrestrial-based access technologies, not shown, that include copper wire, fiber optics, SONET, Ethernet, and Voice over Internet Protocol (VoIP).

Voice network 130 is a communications network capable of transmitting calls between endpoints. In one embodiment of the invention, voice network 130 may be a public switched telephone network (PSTN) that provides mobile cellular services and utilizes air interfaces, e.g., Code Division Multiple Access (CDMA), Time Division Multiple Access (TDMA), Universal Mobile Telecommunications System (UMTS), Global System for Mobile Communications (GSM), etc., not shown, for wirelessly interconnecting individuals. In an alternative embodiment, voice network 130 may be a VoIP network. Voice network 130 provides network access for mobile device 110. Voice network 130, in one example, operates in the circuit-switched domain and in the packet-based domain. For example, voice network 130 employs one or more mobile switching centers (MSCs), not shown, to operate in the circuit-switched domain and one or more packet-based network elements to operate in the packet-based domain.

Telephone switch 140 is a telephone switching system capable of routing calls between endpoints, e.g., mobile device 110, wireline telephone 120 and computing device 190. Telephone switch 140 provides access to voice network 130 for wireline telephone 120 and computing device 190 via access technologies, not shown, such as copper wires and fiber optics. In one embodiment of the invention, telephone switch 140 may be a Private Branch eXchange (PBX). In an alternative embodiment telephone switch 140 may be a softswitch or a telephone gateway. Telephone switch 140 is connected to voice network 130, UIM system 160, user communications portal server 150, voice mail/recording server 170, and conference server 180.

UIM system 160 stores and manages appointment and contact information of subscribers of telephony conference services. Appointment information may include dates, times and locations of conference calls, conference bridge telephone numbers, access codes for conference calls, and vacation schedules. Contact information may include electronic mail addresses and one or more telephone numbers of individuals.

UIM system 160 tracks the dates and times of upcoming conference calls. On the day of the conference call, UIM system 160 may notify a proposed conference call participant with a reminder, e.g., electronic mail, of the conference call. At a predetermined time prior to the start of the conference call, UIM system 160 may attempt to contact the proposed conference call participant. In one embodiment of the invention, UIM system 160 may attempt to contact the proposed conference call participant by placing a call to one of the one or more telephone numbers for the proposed conference call participant that are stored in the proposed conference call participant's profile. The call to the proposed conference call participant may be made using any method available to UIM system 160. In one embodiment of the invention, the call to the proposed conference call participant may be made via modems. In another embodiment of the invention, the call to the proposed conference call participant may be made via a) VoIP, e.g., session initiation protocol (SIP), H.323, or b) direct Transmission Control Protocol/Internet Protocol (TCP/IP) messaging to a server or device that can place calls.

The call to the proposed conference call participant may be placed on a least cost network, e.g., VoIP, or via an Intelligent Network (IN) system. In another embodiment of the invention, UIM system 160 may send a Short Message Service (SMS) message to the proposed conference call participant.

Upon contacting the proposed conference call participant, UIM system 160 may direct an announcement to be played indicating that a conference call is occurring and the proposed conference call participant should attend the conference call. If the proposed conference call participant chooses to attend the conference call, UIM system 160 may call the conference bridge telephone number, e.g., toll free number, at another predetermined time prior to the start of the conference call. When calling the conference bridge telephone number, UIM system 160 may call a lower cost local telephone number rather than the toll free number, if the local telephone number is available.

Upon contacting the conference bridge, UIM system 160 may connect the call to the proposed conference call participant onto a port on the conference bridge. The proposed conference call participant may attend the conference call in a variety of participation modes, including a) a normal participant mode, i.e., speak and listen, b) a listen only mode, c) a record only mode, and d) a listen and record mode. A conference manager may be able to control the participation modes by, for example, blocking the record only mode or limiting the listen only mode.

If UIM system 160 cannot contact the proposed conference call participant after a predetermined number of attempts, then UIM system 160 may attempt to call the remainder of the one or more telephone numbers stored in the proposed conference call participant's profile. The predetermined number of attempts may be set to a specific length of time or a specific number of rings. If the proposed conference call participant cannot be contacted, or if the proposed conference call participant chooses to record the conference call without attending, then UIM system 160 may call the conference bridge telephone number and, upon connecting to the conference bridge, direct another network element, e.g., voice mail/recording server 170, to record the conference call for the proposed conference call participant. Also, UIM system 160 may be able to access the vacation schedule for the proposed conference call participant and determine alternative arrangements for handling the conference call, e.g., connecting to a delegate, during such occasions. Furthermore, UIM system 160 may allow the proposed conference call participant to identify particular conference calls that should not be connected by setting an indicator, e.g., flag, in the system.

In one embodiment of the invention, UIM system 160 may be implemented as an application on a server. In another embodiment of the invention, UIM system 160 may be implemented as a program on a laptop computer or other computing device. UIM system 160 is connected to telephone switch 140.

Advantageously, due to UIM system 160, the proposed conference call participant need not synchronize and operate a PDA or other systems to be reminded of the conference call as done in the prior art, because the proposed conference call participant may be located and contacted via any of their telephones numbers, e.g., wireline, wireless, etc. Also, advantageously, UIM system 160 automates the entire set-up of the conference call connection eliminating the need to search for conference bridge telephone numbers, access codes, and dialing procedures as done in the prior art.

User communication portal server 150 uses find me/follow me functionality to locate an individual based on telephone numbers of the individual that may be stored in a repository of customer data, e.g., UIM system 160. User communication portal server 150 may be used optionally or in conjunction with UIM system 160 to locate and contact the individual. User communication portal server 150 may access a number of stored telephone numbers associated with the individual.

In one embodiment of the invention, user communication portal server 150 may access a calendar program to determine which telephone number should be called for a specific proposed conference call participant on a specific day or at a specific time. In an alternative embodiment of the invention, user communication portal server 150 may access a presence based system that may, for example, detect a location of a cellular telephone of the proposed conference call participant. In another embodiment of the invention, user communication portal server 150 may locate a specific proposed conference call participant by calling all of the telephone numbers in the profile of the proposed conference call participant at once and the call is connected to the first telephone number that answers, i.e., flexible alerting. In yet another embodiment of the invention, user communication portal server 150 may call all of the telephone numbers in the profile of the proposed conference call participant in sequence. User communication portal server 150, in one example, comprises one or more of a Lucent Communication Manager (Lucent Technologies, 600 Mountain Ave., Murray Hill, N.J. 07974-0636, 1 888 458-2368, http://www.lucent.com).

Voice mail/recording server 170 prompts callers to leave a voice mail message for individuals, and voice mail/recording server 170 records the voice mail message when individuals are not available for calls. In general, an individual may be unavailable for calls if a) the individual has an ongoing conversation, b) the individual cannot speak or does not wish to speak to the caller, c) the telephone is not in the possession of the owner, or d) operational issues, e.g., the telephone is turned off, the telephone is out of signal range, low battery condition, damaged or lost telephone, etc. Voice mail/recording server 170 stores a number of voice mail messages for individuals in a memory unit, not shown, until the voice mail messages are retrieved and deleted by the individual.

In one embodiment of the invention, voice mail/recording server 170 may be used to record conference calls attended in record only mode when proposed conference call participants are unavailable for conference calls. In another embodiment of the invention, there may be a stand-alone recording system to record the conference calls. Voice mail/recording server 170, in one example, comprises one or more of a Sierra® voice mail server (Lucent Technologies, 600 Mountain Ave., Murray Hill, N.J. 07974-0636, 1 888 458-2368, http://www.lucent.com), and Lucent Technologies AnyPath® voice messaging server (Lucent Technologies, 600 Mountain Ave., Murray Hill, N.J. 07974-0636, 1 888 458-2368, http://www.lucent.com). Voice mail/recording server 170 is connected to telephone switch 140.

Conference server 180 allows several conference call participants to call a telephone number for a conference bridge and be connected to each other in order to conduct a single location or multi-location audio-conference. Conference server 180 may provide additional advanced features such as a) password controlled access to a conference call, b) name announcing, e.g., a prerecorded name or a computer speech generated name, upon access to the conference call, and c) notification of additions of participants to the conference call or drops of participants from the conference call. In one embodiment of the invention, conference server 180 may be a stand-alone box with multiple telephone lines, e.g., 1.5 Mbps lines, providing the conference service. In another embodiment of the invention, conference server 180 may be integrated into current messaging applications such as Microsoft Exchange, Microsoft Live Communications Server, or the Lucent Technologies AnyPath® voice messaging server.

Computing device 190 may be any type of processor capable of transmitting information between endpoints. Computing device 190 may be used to access a computer system having UIM software to enter appointments or to accept meeting requests, e.g., by electronic mail. Computing device 190 should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. The functions of computing device 190 may be provided by a single dedicated processor, by a single shared processor, or by a plurality of individual processors, some of which may be shared.

In one embodiment of the invention, computing device 190 may be a laptop computer. However, in alternative embodiments of the invention, computing device 190 may be a desktop computer, PDA, or similar device.

Those of ordinary skill in the art will readily be able to select telephone switches, user communication portal servers, voice mail/recording servers, conference servers, and computing devices appropriate for use in any particular implementation of a user information management system.

Figure 2:
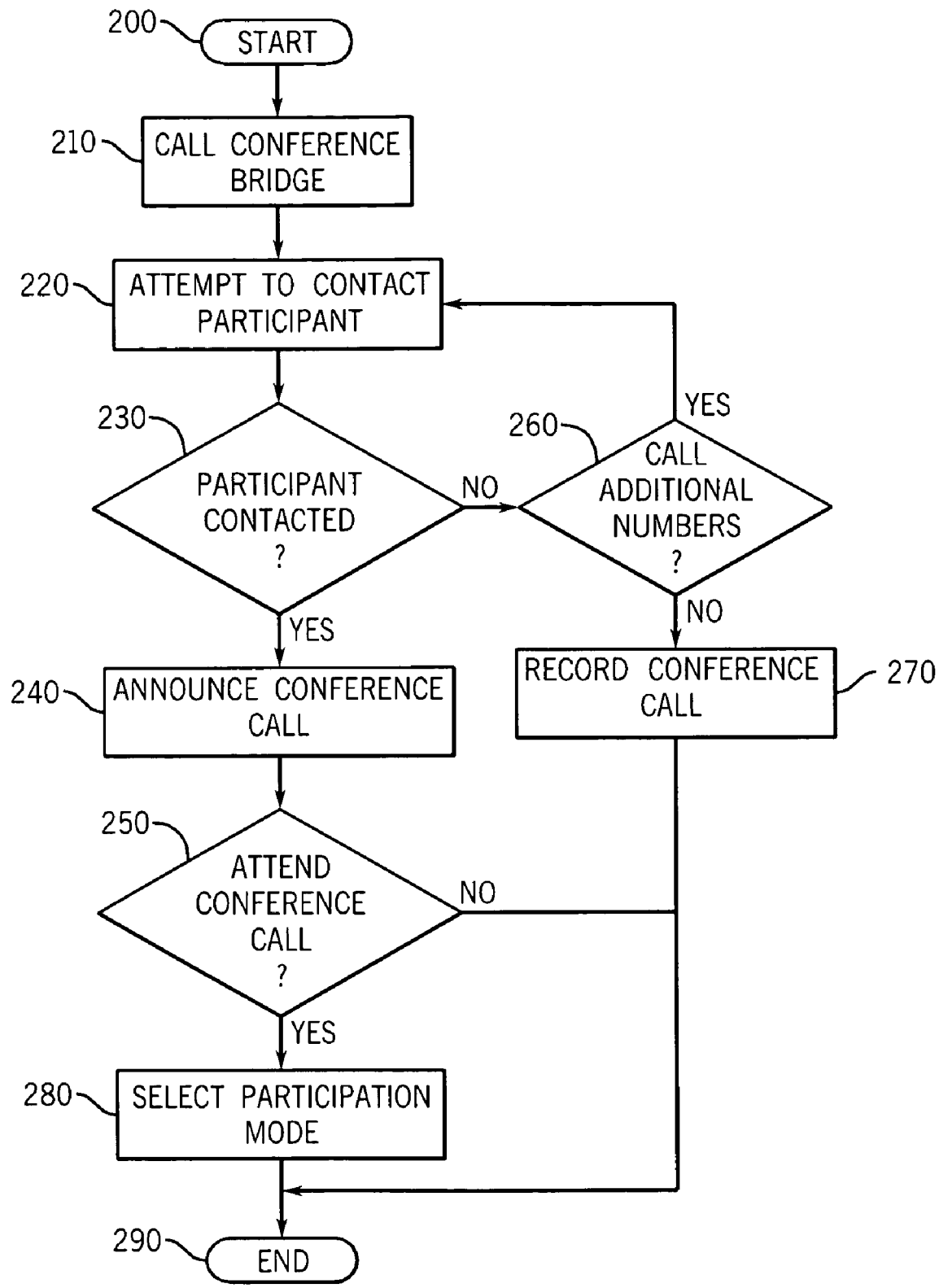
FIG. 2 shows a flow chart for a method of operating a user information management system that manages and controls connections to conference bridges arranged in accordance with the principles of the invention.

FIG. 2 shows a flow chart of the operation of the UIM system that controls connections to conference bridges in accordance with the principles of the present invention. The process is entered in step 200 when UIM system 160 (FIG. 1) monitors the time and upcoming appointments that require participation by an individual, e.g., mobile device 110 (FIG. 1).

In step 210 (FIG. 2), when a conference call time threshold has been crossed, UIM system 160 (FIG. 1) calls a telephone number associated with a conference bridge, e.g., conference server 180 (FIG. 1), at a first predetermined interval prior to a start of the conference call.

In step 220 (FIG. 2), UIM system 160 (FIG. 1) attempts to contact the individual, e.g., mobile device 110 (FIG. 1), scheduled to participate on the conference call by calling a telephone number from the individual's profile using a VoIP system or an IN system or by sending a SMS message. Optionally, the find me/follow me functionality of user communication portal server 150 (FIG. 1) may be used to locate the individual.

In step 230 (FIG. 2), it is necessary to determine whether the individual, e.g., mobile device 110 (FIG. 1), has been contacted.

If the test result in conditional branch point 230 (FIG. 2) is YES, indicating that the individual has been contacted, then control is passed to step 240. In step 240, an announcement may be played to the individual indicating that a conference call is occurring and the individual should attend the conference call. Additional text to speech functions may be used to announce the conference title and any appropriate notes attached to the meeting notice. Thereafter, control passes to step 250. If the test result in step 230 is NO, indicating that the individual has not been contacted, then control is passed to step 260.

In step 260 (FIG. 2), it is necessary to determine whether additional telephone numbers for the individual, e.g., mobile device 110 (FIG. 1), are available.

If the test result in conditional branch point 260 (FIG. 2) is YES, indicating that the individual has additional telephone numbers, then control is passed to step 220, and UIM system 160 (FIG. 1) calls the telephone numbers or sends a SMS message. Optionally, the find me/follow me functionality of user communication portal server 150 (FIG. 1) may be used to locate the individual. If the test result in step 260 (FIG. 2) is NO, indicating that the individual has no additional telephone numbers, then control is passed to step 270.

In step 270, UIM system 160 (FIG. 1) alerts the conference moderator that the conference call will be recorded, e.g., voice mail/recording server 170 (FIG. 1), due to the absence of the individual, e.g., mobile device 110 (FIG. 1). Thereafter, control passes to step 290 (FIG. 2).

In step 250, it is necessary to determine whether the individual, e.g., mobile device 110 (FIG. 1) agrees to participate on the conference call.

If the test result in conditional branch point 250 (FIG. 2) is YES, indicating that the individual agrees to participate on the conference call, then control is passed to step 280. In step 280, the individual has the opportunity to attend the conference call in a) a normal participant mode, i.e., talk and listen, b) a listen only mode, c) a record only mode, or d) a listen and record mode. When operating in the record only mode, an announcement may be made to the other conference call participants that recording is occurring. Thereafter, control passes to step 290. If the test result in step 250 is NO, indicating that the individual does not agree to participate on the conference call, then control is passed to step 290.

The process is exited in step 290.

The foregoing merely illustrates the principles of the invention. It will thus be appreciated that those skilled in the art will be able to devise various arrangements, which, although not explicitly described or shown herein, embody the principles of the invention, and are included within its spirit and scope.

We claim:

1. A method, comprising the steps of:
    initiating, via a first signaling protocol, a call to a first telephone number associated with a conference bridge at a first predetermined interval prior to a start of a conference call;
    initiating, via a second signaling protocol, a call to at least one telephone number associated with a proposed conference call participant at a second predetermined interval prior to the start of the conference call; and
    connecting the call associated with the at least one telephone number to the call associated with the first telephone number onto the conference bridge.

2. The method of claim 1 further comprising the step of storing a profile of the proposed conference call participant and data for the conference call.

3. The method of claim 2 wherein the profile of the proposed conference call participant comprises one or more telephone numbers of the proposed conference call participant.

4. The method of claim 3 wherein the data for the conference call comprises a date for the conference call, a start time for the conference call, a telephone number for the conference bridge, and codes to access the conference call.

5. The method of claim 1 wherein the initiating, via a second signaling protocol step further comprises the step of determining a location of the proposed conference call participant based on the at least one telephone number.

6. The method of claim 1 wherein the initiating, via a second signaling protocol step further comprises the step of sending a Short Message Service (SMS) message to the at least one telephone number.

7. The method of claim 1 wherein the initiating, via a second signaling protocol step further comprises the step of using a least cost route via a Voice over Internet Protocol (VoIP) network.

8. The method of claim 1 wherein the proposed conference call participant responds to the initiating, via a second signaling protocol step with a response selected from the group consisting of a) connect to the conference bridge, b) do not connect to the conference bridge, and c) record the conference call.

9. The method of claim 1 wherein the first signaling protocol and the second signal protocol are the same.

10. The method of claim 9 wherein the first signaling protocol and the second signal protocol are selected from the group consisting of a) session initiation protocol (SIP), b) H.323, and c) Transmission Control Protocol/Internet Protocol (TCP/IP) messaging to a server or device that can place calls.

11. An apparatus, comprising:
    a telephone switch operable to switch calls between a plurality of communications devices via a network;
    a first server coupled to the telephone switch, the first server operable to connect at least two communications devices onto a conference bridge; and
    a second server coupled to the telephone switch, the second server operable to a) initiate a call to a first stored telephone number of at least one of the at least two communications devices, b) initiate a call to a second stored telephone number corresponding to the conference bridge, and c) connect the call associated with first stored number to the call associated with second stored number.

12. The apparatus of claim 11 further comprising a third server coupled to the telephone switch, the third server operable to determine a location of the at least one of the at least two communications devices based on the first stored telephone number.

13. The apparatus of claim 11 further comprising a voice mail and recording server coupled to the telephone switch, the voice mail and recording server operable to record a conference call when a user of the at least one of the at least two communications devices is unavailable for the conference call.

14. An apparatus, comprising:
    means for initiating, via a first signaling protocol, a call to a first telephone number associated with a conference bridge at a first predetermined interval prior to a start of a conference call;
    means for initiating, via a second signaling protocol, a call to at least one telephone number associated with a proposed conference call participant at a second predetermined interval prior to the start of the conference call; and
    means for connecting the call associated with the at least one telephone number to the call associated with the first telephone number onto the conference bridge.

15. The apparatus of claim 14 further comprising means for storing a profile of the proposed conference call participant and data for the conference call.

16. The apparatus of claim 15 wherein the data for the conference call comprises a date for the conference call, a start time for the conference call, a telephone number for the conference bridge, and codes to access the conference call.

17. The apparatus of claim 14 wherein the means for initiating, via a second signaling protocol further comprises means for determining a location of the proposed conference call participant based on the at least one telephone number.

18. The apparatus of claim 14 wherein the means for initiating, via a second signaling protocol further comprises means for sending a Short Message Service (SMS) message to the at least one telephone number.

19. The apparatus of claim 14 wherein the means for initiating, via a second signaling protocol further comprises the use of a least cost route via a Voice over Internet Protocol (VoIP) network.

20. The apparatus of claim 14 wherein the proposed conference call participant responds to the means for initiating, via a second signaling protocol with a response selected from the group consisting of a) connect to the conference bridge, b) do not connect to the conference bridge, and c) record the conference call.

21. The apparatus of claim 14 wherein the first signaling protocol and the second signal protocol are the same.

22. The apparatus of claim 21 wherein the first signaling protocol and the second signal protocol are selected from the group consisting of a) session initiation protocol (SIP), b) H.323, and c) Transmission Control Protocol/Internet Protocol (TCP/IP) messaging to a server or device that can place calls.

23. An apparatus operable to call, at a predetermined interval prior to a start of a conference call, a first telephone number associated with a conference bridge and at least one telephone number associated with a proposed conference call participant, and, upon connection to the conference bridge and the proposed conference call participant, the apparatus connects the calls.

24. The apparatus of claim 23 wherein the first telephone number and the at least one telephone number are connected via a least cost route on a Voice over Internet Protocol (VoIP) network.

\* \* \* \* \*

UNITED STATES PATENT AND TRADEMARK OFFICE
CERTIFICATE OF CORRECTION

| | | |
|---|---|---|
| PATENT NO. | : 7,653,193 B2 | Page 1 of 1 |
| APPLICATION NO. | : 11/338081 | |
| DATED | : January 26, 2010 | |
| INVENTOR(S) | : Pfleging et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1039 days.

Signed and Sealed this

Twenty-eighth Day of December, 2010

David J. Kappos
*Director of the United States Patent and Trademark Office*